Sept. 19, 1939.  J. C. THOMAS  2,173,736
BATTERY-SERVICING UNIT
Filed Aug. 29, 1935  3 Sheets-Sheet 2

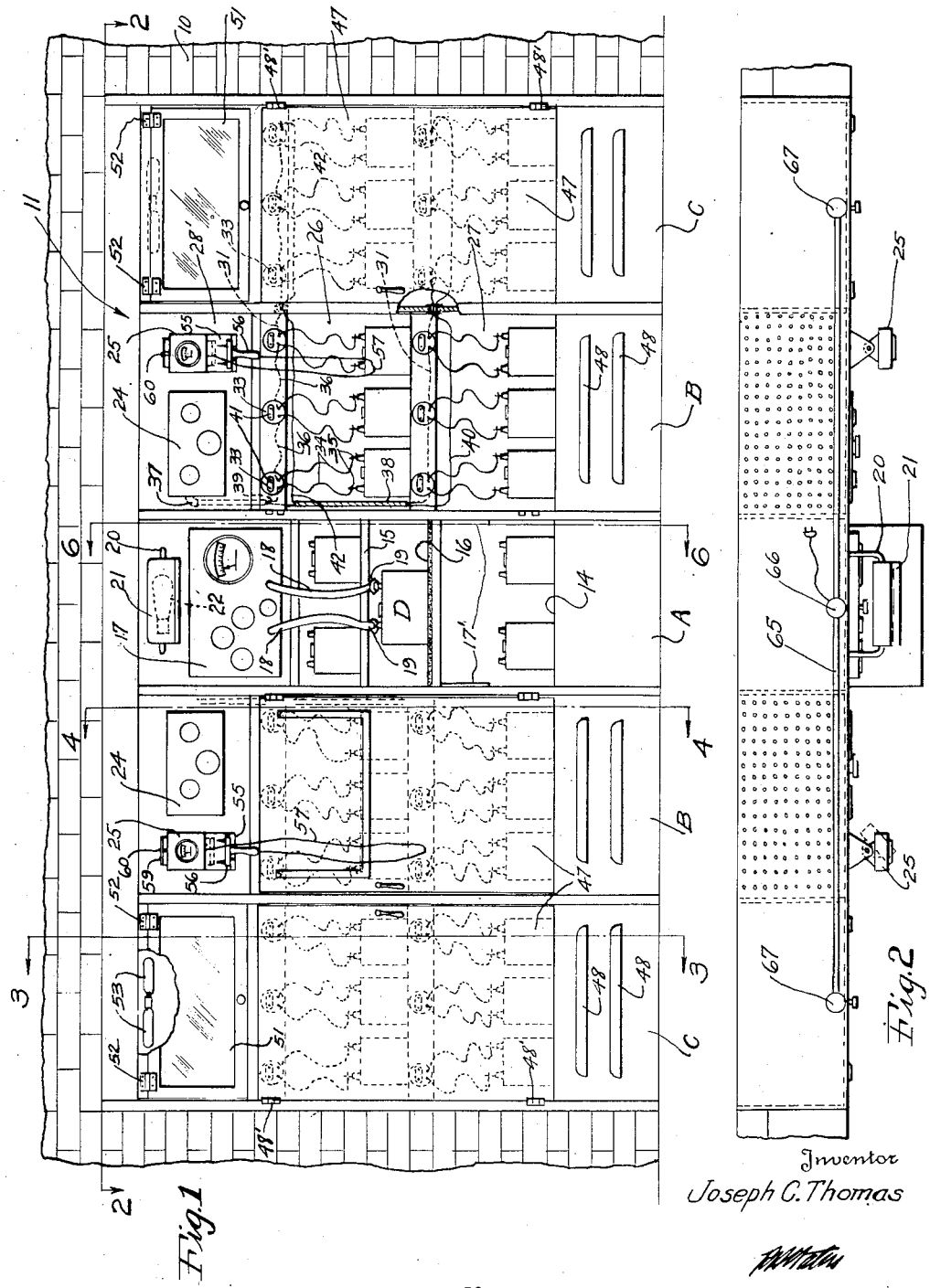

Inventor
Joseph C. Thomas

By

Attorney

Sept. 19, 1939.  J. C. THOMAS  2,173,736
BATTERY-SERVICING UNIT
Filed Aug. 29, 1935  3 Sheets-Sheet 3

Inventor
Joseph C. Thomas
By
Attorney

Patented Sept. 19, 1939

2,173,736

UNITED STATES PATENT OFFICE 2,173,736

BATTERY-SERVICING UNIT

Joseph C. Thomas, Akron, Ohio, assignor to Wingfoot Corporation, Wilmington, Del., a corporation of Delaware Application August 29, 1935, Serial No. 38,425

8 Claims. (Cl. 175—183)

The present invention relates to a battery-servicing unit for use in filling stations, garages and the like, and one object of this invention is to provide a complete, efficient and inexpensive servicing unit with which one can service a battery quickly and efficiently.

Another object of this invention is to provide a battery-servicing unit cooperating with a wall of a building in such a manner that the interior thereof will be accessible from either side of the wall. Preferably the wall would be an interior wall, such as a partition wall, with a service room on one side and a repair room on the other.

A still further object of this invention is to provide a servicing unit arranged in cooperative relation with an opening in a wall whereby the interior of the servicing unit is made accessible through said opening.

Another object of this invention is to provide in a servicing unit of the character described, a cabinet having the rear side thereof open so as to permit access from the rear as well as from the front, the front being also provided with openings normally closed by suitable doors. Thus, the mechanic working on batteries in said servicing unit, desiring to repair said batteries, can remove the batteries from the rear of the cabinet without going around the same to the front thereof.

Another object of this invention is to provide a servicing unit of the character described in which there is a convenient arrangement of the testing and charging units.

A still further object of this invention is to provide a servicing unit of the character described embodying display shelves and cases in addition to the racks, charging units and testing units embodied therein. The display shelves and cases are conveniently positioned with respect to the racks upon which the batteries to be serviced rest, whereby a quick comparison of an old and new battery can be obtained without loss of time.

Another object of this invention is to provide a battery-testing device from which readings are to be taken, which device is angularly movable to various convenient positions for ready reading thereof when any one of a number of batteries, arranged in a series in the servicing unit, is tested. Preferably this angular movement is accomplished automatically as the party makes the test on the battery.

Another object of this invention is to provide ventilation for the servicing unit whereby gases coming from the batteries will be carried out of the servicing unit into the atmosphere, preferably through the back thereof, whereby obnoxious gases do not fill the room at the front of the servicing unit where the customers generally are.

Another object of this invention is to adequately ventilate the charging unit whereby the heat generated thereby is carried off, whereby to increase the efficiency of operation of the charging unit.

Another object of this invention is to provide an arrangement for the battery-supporting trays whereby to simplify the wiring of the servicing cabinet and to protect the wiring, without the necessity of making specially shaped trays to fit different parts of the cabinet. In carrying out this object, I also have the object in mind of protecting the cabinet by providing trays which are imperforate.

Another object of this invention is to provide tray supports cooperating in such a way with conduits in which some of the electrical wires are disposed, as to protect the wires and close the normally open side of the conduit.

A still further object of this invention resides in providing a novel tray for supporting the batteries when being charged.

Other objects of this invention will appear hereinafter as the description thereof proceeds, the novel features, arrangements and combinations being clearly set forth in the specification and in the claims thereunto appended.

In the drawings:

Fig. 1 is a front elevation of a device embodying my invention;

Fig. 2 is a cross-section taken on the line 2—2 of Fig. 1;

Figure 3:
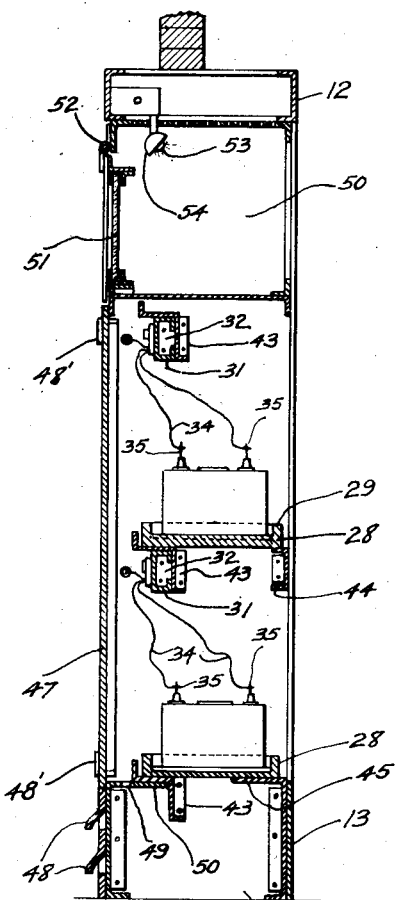
Fig. 3 is a vertical section taken on the line 3—3 of Fig. 1.

In the drawings, 10 represents a brick or any other type wall of a building structure having an opening of substantially the same height and length as the battery-servicing unit indicated at 11, whereby the latter may be positioned within the opening to substantially fill the same as illustrated particularly in Figs. 1 and 3. The servicing unit comprises in the present instance five sections arranged in horizontal alignment, and these sections comprise a center section A, adjacent sections B, each of similar construction and end sections C, each of similar construction. The servicing unit is designed for efficient battery service and the servicing unit is arranged within the opening in the wall for the purpose of permitting access to the servicing unit from either side of the wall. As will be seen from an inspection of Figs. 3, 4 and 6, the rear side of the servicing unit is open except at the upper and lower sides thereof, as at 12 and 13, respectively, to permit access to the servicing unit from the rear side thereof.

Figure 6:
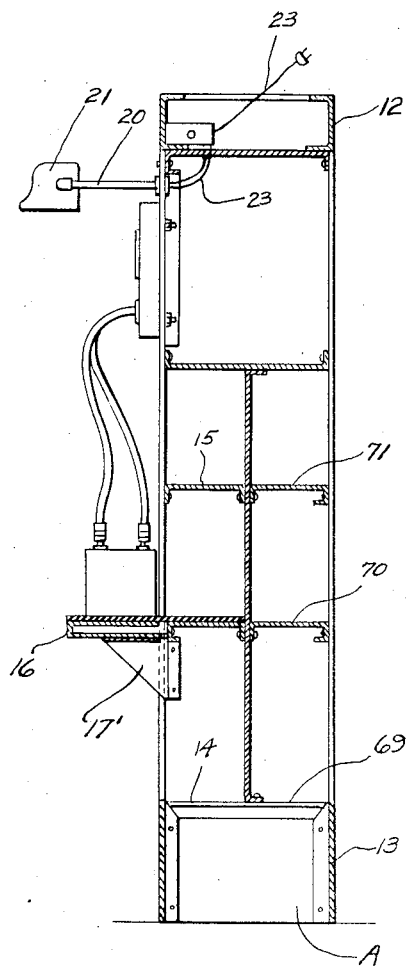
Fig. 6 is a vertical cross-section taken along the line 6—6 of Fig. 1.

The center section A has supporting shelves 14 and 15 upon which batteries to be tested may be placed and there is a third shelf 16 projecting outwardly somewhat from the front of the servicing unit as shown in Fig. 6, to which the batteries can be transferred for more convenient testing, the shelf 16 being so positioned with respect to the instruments used for testing purposes that the lead wires from the testing unit will just conveniently reach the terminals of the battery.

The shelf 16 is supported by brackets 17' attached to the inner side walls of the section A as clearly illustrated in Figs. 1 and 6. Just above the shelf 15 there is arranged a battery-testing unit 17 of any desired design and this testing unit has lead wires 18 connected thereto. The lower free ends of the lead wires 18 are provided with any suitable means for connecting the same to the terminals of a battery, such as the spring clamps 19. In order to illuminate the instruments of the testing unit 17, I provide a bracket 20 carrying a lamp shade 21 having a lamp bulb 22 therein connected as by a suitable connecting cord and plug 23 to a suitable outlet at the place where the same is installed.

Each of the sections B at the upper side thereof are provided with a charging unit 24 of any suitable type and an angularly movable voltmeter 25, to be described more in detail later.

Figure 4:
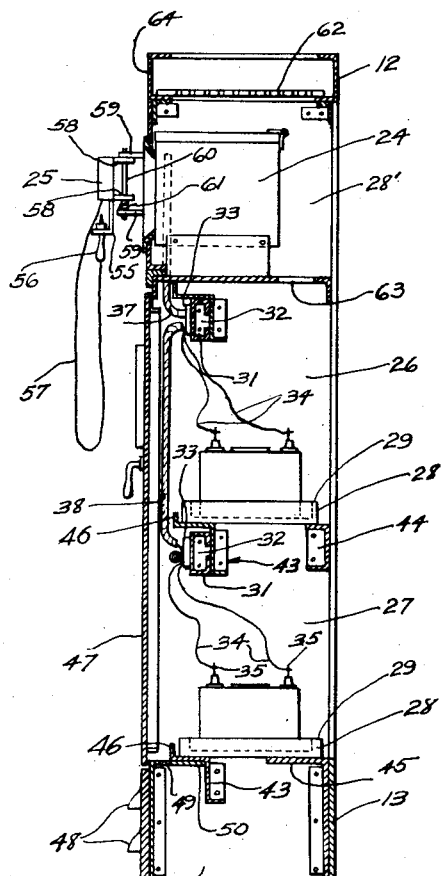
Fig. 4 is a vertical section taken along the line 4—4 of Fig. 1.
Figure 5:
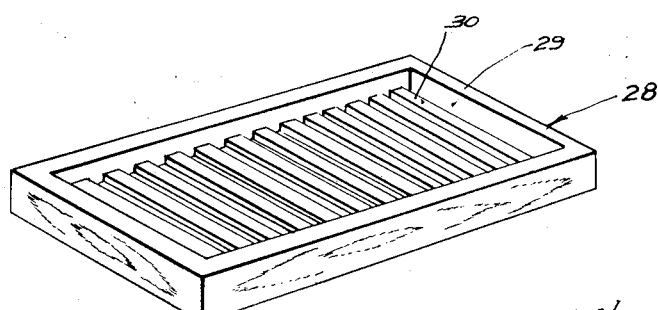
Fig. 5 is an isometric view of the battery tray forming part of my invention.

As will be seen more clearly from Figs. 1 and 4, there are two compartments 26 and 27 arranged beneath the compartment 28', which houses the charging unit 24. Each of the compartments 26 and 27 are for the purpose of receiving storage batteries which are to be charged and/or tested. The batteries rest on wooden trays 28, each having a peripheral wall 29 and slats 30 arranged in parallel relation at the bottom of the tray whereby foreign matter, such as acid and the like, falling from the battery will collect in the spaces between the slats 30. The wooden trays are preferably made acid-resisting, first by impregnating the wood with suitable acid-resisting compounds of any well-known type, and by then giving them a coat of acid-resisting rubber-base enamel or paint. The peripheral edges 29 of the tray prevent material falling from the batteries from dropping down onto the tray-supporting brackets, which are preferably of metal, and on the other metal parts of the servicing unit, thereby increasing the life of the servicing unit.

Attached at their ends to the opposite side walls of the compartments 26 and 27 are electrical conduits 31 of substantially channel shape having longitudinal openings 32 at the rear thereof to facilitate the connection of the wires arranged therein to the various electrical outlets 33 arranged on the front side of the channel conduits 31.

Each of the electrical outlets 33 is provided with lead wires 34, the free ends of which are provided with terminals 35 adapted to be connected to the terminals of a battery, and, as will be seen clearly from an inspection of conduits 31, the leads 34 are connected by leads 36 to adjacent leads of adjacent outlets with the endmost outlets of the series connected by leads which are in turn connected to the charging unit 24, the same passing through the electrical conduits 37 and 38, the hook-up being such that a wire 39 leads downwardly from a charging unit through the conduit 37 to the first outlet 33 adjacent the center section A and in the upper row of outlets. Another wire 40 leads from the charging unit 24 downwardly through the conduits 37 and 38 and is connected to the outermost outlet of the lower row of outlets, as is clearly illustrated in Fig. 1, whereby a complete series circuit is provided for the outlets from the charging units, and the batteries complete the circuit when connected to the lead wires 34 in the manner illustrated. If there is less than a sufficient number of batteries to be connected to the charging outlets 33, to complete the cirsuit, the terminals 35 of lead wires 34 are connected to a bus bar 41 provided on the outside of the outlet so that the series circuit will be complete. This series hook-up is one which is commonly used in this art for charging batteries. For the sake of clearness I have illustrated some of the wires in Fig. 1 as not being arranged within the electrical conduits 31, but it is to be understood that all of the wires extending horizontally to connect the outlets and for the return line are arranged within the electrical conduits 31, as is illustrated in Fig. 4. Note also that the endmost electrical outlet of the upper row is connected by a lead wire 42 to the innermost outlet of the lower row and this wire extends through the upper conduit 31 and vertically extending conduit 38.

Similarly shaped brackets 43 are connected to the opposite inner side walls of sections B and C for the purpose of supporting the front edges of the trays 28, as will be clearly seen from an inspection of Figs. 3 and 4. Each of the brackets has a cross-section, such as that illustrated in Figs. 3 and 4, and extends substantially the full length of each of the conduits 31 with which it is associated. By an inspection of these figures, it will be clear that a vertically extending portion of each of the upper brackets 43 covers the opening 32 to seal the conduit, and the upper horizontally extending portion of each bracket overlies the conduit with which it is associated to prevent foreign matter, especially acid and the like, from seeping down into the conduits 31, thereby protecting the electrical wires arranged therein.

Also note that the upper horizontal portion of each bracket upon which the tray rests extends forwardly a sufficient amount to overlie the electrical outlets 33 to protect them in a similar manner. The rear ends of the trays are supported by any suitable brackets, such as channels 44 and 45.

The trays rest loosely on the brackets 43 and are held against forward movement by the upwardly extending edges 46 on the brackets 43. These edges are arranged inwardly a sufficient amount from the front side of the servicing unit as to provide a space of sufficient dimensions to permit the conduits 37 and 38 to be brought down in front of the conduits 31 and to be connected to the latter at the front side thereof, making it unnecessary therefore to drill special holes through the brackets 43 or the trays 28.

With such an arrangement, it is therefore possible to provide trays of similar shape for all of the compartments so that they are interchangeable and so that a user in ordering replacement trays need not specify for what section of the compartment the tray is desired.

The front sides of the compartments 26 and 27 are closed by the swinging doors 47 hinged at 48' to the servicing unit and when these doors are opened access may be had to the batteries from the front side of the service unit.

In Fig. 1 the door of section B at the right has been removed to illustrate the invention more clearly, but is similar to the door of section B at the left. The doors prevent the escape of the gases arising from the batteries into the room at the front side of the wall 10 and protect the batteries against foreign matter which may drift into the room from the street. At the base of each of the compartments B and C there are provided louvres 48 which permit air to enter the bottom of each section, and as will be clearly seen in Figs. 3 and 4 there are additional openings 49 in horizontally extending portions 50 of the base whereby air may enter the louvres 48 and pass upwardly through the openings 49 into the compartments 26 and 27 to carry away the gases forming in the compartments, through the open back of the servicing unit. The back of the servicing unit is arranged in communication preferably with the shop where repairing and the like is done. It will be noted that, since the brackets 43 and trays 28 are spaced rearwardly of the doors 47, the air can circulate freely from the lower compartment 27 to the upper compartment 26.

Thus, it will be seen that the spacing of the battery trays and tray-supporting brackets from the doors accomplishes a dual purpose, namely it provides a space to permit electrical connections to be made readily to the conduits 31 and also provides ventilating means for the compartments 26 and 27, and, as will be seen later, for the charging units 24.

At the top of each of the sections C is provided a display compartment 50 provided at the front side thereof with a swinging door 51 pivoted on hinges 52. The compartment is illuminated by suitable lamps 53 provided with a shade or shades 54. In these compartments batteries or battery accessories and the like may be displayed and any batteries in such compartments may be quickly mounted on the testing shelf 16 in the same position as the battery D shown on the shelf in the illustrated embodiment.

In order to test the batteries while on the trays 28 or on the shelf 16, I provide the previously referred to voltmeter 25. This voltmeter is most clearly illustrated in Figs. 1, 2 and 4. The instrument itself is of any suitable type and the casing therefor is preferably mounted as illustrated in the drawings. The lower side thereof is provided with downwardly and then outwardly extending supports 55 on which the testing jack 56 is supported when not in use. The testing jack is connected by a cord 57 to the voltmeter at the under side thereof (see Figs. 1 and 4). The voltmeter has rearwardly extending parallel ears 58 and the cabinet is provided with similar parallel ears 59 arranged above and below the upper and lower ears 58 respectively. A pivot pin 60 passes through the ears 58 and 59 forming a swivel for the voltmeter 25, so that the same may be angularly moved in a substantially horizontal direction to face the dial of the voltmeter in various directions, whereby when a battery is being tested the operator can turn the voltmeter to a convenient position for easy reading from a position adjacent the battery being tested, thereby eliminating any error in reading the voltmeter due to parallax. As will be noted from an inspection of Fig. 4 the cord 57 is connected to the voltmeter at the lower side thereof and outwardly from the pivot 60. As a result of this arrangement it is only necessary for the operator to take up a position adjacent the battery to be tested, and pull on the cord 57 to pivot the voltmeter into the proper position for easy and correct reading from his position adjacent the battery. With this arrangement the operator can move from one battery to another, testing each, and keeping a slight tension on the cord, whereby he can quickly read the voltage of any of the batteries without having to manually grasp the voltmeter to change the angular position thereof or, in the case of a fixed voltmeter, squirm around to such a position that by straining his neck he can take a reading from the same, a reading which is apt to be inaccurate due to parallax. The operator can test batteries on the shelves 14, 15 and 16, as well as those on the racks 28. A spring 61 arranged beween the lower ears 58 and 59 resiliently supports the voltmeter and prevents undue vibration thereof, while at the same time permitting easy movement of the voltmeter to any of its angular positions. The spring also takes up some of the shock which may be imparted thereto if the operator pulls too suddenly on the cord 57 when testing the battery.

In order to carry off the heat generated by the chargers 24, I provide the compartments 28' in which the chargers are arranged with upper and lower perforated plates 62 and 63, so that some of the air coming upwardly through the compartments 26 and 27 will pass into the compartments 28' and around the charging units 24. This air is thereafter carried out partially thru the perforated plate 62 and the rear open side of the servicing unit. The upper perforated plate 62 is preferably made so as to just rest loosely on the inner lower flanges of the channels 12 and 64 forming the rear and front sides, respectively, of the upper edge of the servicing unit to permit inspection of the charging unit. The plate 62, in addition to aiding circulation of the air about the charging unit 24, prevents large foreign objects from falling on the charging unit, for at times it may be that mechanics working in a position higher up, may drop tools and the like, which, if they strike the charging unit, might damage same or cause short circuiting if the same happened to strike some of the electrical connections.

As will be seen from an inspection of Fig. 2, an electrical conduit 65 is provided with outlet boxes 66 and 67, the former being for connecting the cord 23 to the socket for the lamp 22 and the latter forming outlets for the wires in the conduit 65 to the lamps 53 in the show cases 50.

Figure 7:
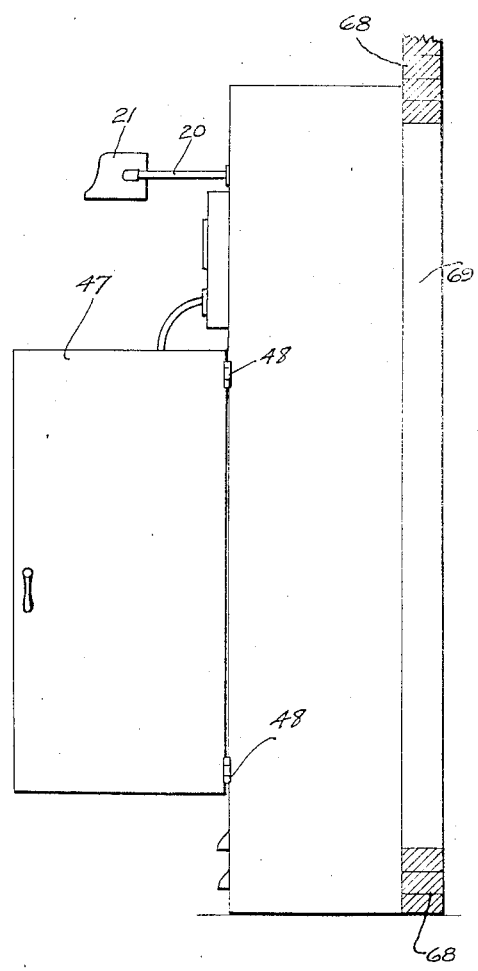
Fig. 7 is an end elevation of a modification of my invention.

In Fig. 7 I have shown a modification of my invention in which, instead of having the servicing unit built into the wall, as in Figs. 1 and 2, the same is placed in abutting relation with the wall 68, which has an opening 69, smaller than the outer peripheral dimensions of the servicing unit, whereby as in Figs. 1 and 2 access may be had to the interior of the servicing unit from either side of the wall 68.

As will be seen from inspection of Fig. 6, there are additional shelves 69, 70, and 71 provided at the rear of the servicing unit on which additional batteries, such as new or rental batteries, may be stored in a convenient position so that when desired at the front of the unit an operator may lift such batteries off of the shelves and place them on any of the racks 28 where they will then be accessible from the front of the servicing unit.

Obviously, those skilled in the art to which this invention pertains may make various changes in the construction of this invention as shown herein without departing from the spirit of this invention and therefore I do not wish to be limited except as may be hereinafter set forth in the claims.

What I claim is:

1. In combination with a building having a wall with an opening of substantial size therein, a battery servicing unit having servicing equipment associated therewith and being open on one side thereof, said battery servicing unit being arranged adjacent said wall with said open side substantially parallel with one side of said wall, the opposite side of said unit being provided with at least one opening of substantial size, and said unit being arranged adjacent said opening in said wall in such a position as to make the interior of said unit accessible from either side of said wall.

2. A device as claimed in claim 1 in which said unit is arranged within and substantially fills the opening in said wall.

3. A device as set forth in claim 1 in which said unit is arranged with said first mentioned side abutting against the face of said wall about the edges of said opening to close the opening in said wall, the first open side of said unit being accessible through said opening in said wall.

4. In a servicing unit the combination of a cabinet having an open back and at least one horizontally extending, battery-supporting rack arranged therein, and means for closing the front side of said cabinet, said cabinet being provided with ventilating openings for circulating air from beneath said racks upwardly and over said racks and finally outwardly through the open back of said cabinet.

5. In a servicing unit, the combination of a cabinet having an open back and at least one horizontally extending battery-supporting rack arranged therein, and means for closing the front side of said cabinet, said cabinet being provided with ventilating openings for circulating air from beneath said racks upwardly and over said racks and finally outwardly through the open back of said cabinet, some of said openings being provided adjacent the bottom and at the front of said cabinet beneath the lowermost of said racks whereby the air is circulated in the manner set forth.

6. In a battery-servicing unit the combination with at least one longitudinal electrical conduit having an open side, for enclosing wires leading to the charging unit, of supports for said conduit, and tray-supporting brackets, at least one of which covers the open side of said conduit and partially overlies the upper side thereof.

7. In a battery-servicing unit the combination with a cabinet having battery-supporting racks, of a charging unit above said racks, a support for said charging unit above said battery racks and a cover for said charging unit, said support and covering for said charging unit being provided with a plurality of ventilating openings through which air circulates to convey the heat away from said charging unit.

8. In a servicing unit the combination with a cabinet having openings at the front thereof, closures for said openings and a removable battery tray arranged within said cabinet and accessible through one of said openings when the door for that opening is open, said battery tray being spaced from said closure when the latter is closed, whereby to ventilate the space about said batteries and provide a space for electrical connections without interfering with the removability of the tray.

JOSEPH C. THOMAS.